TONE GENERATOR WITH INCREASING VOLUME AFTER EACH TONE INTERRUPTION
Filed Nov. 10, 1965
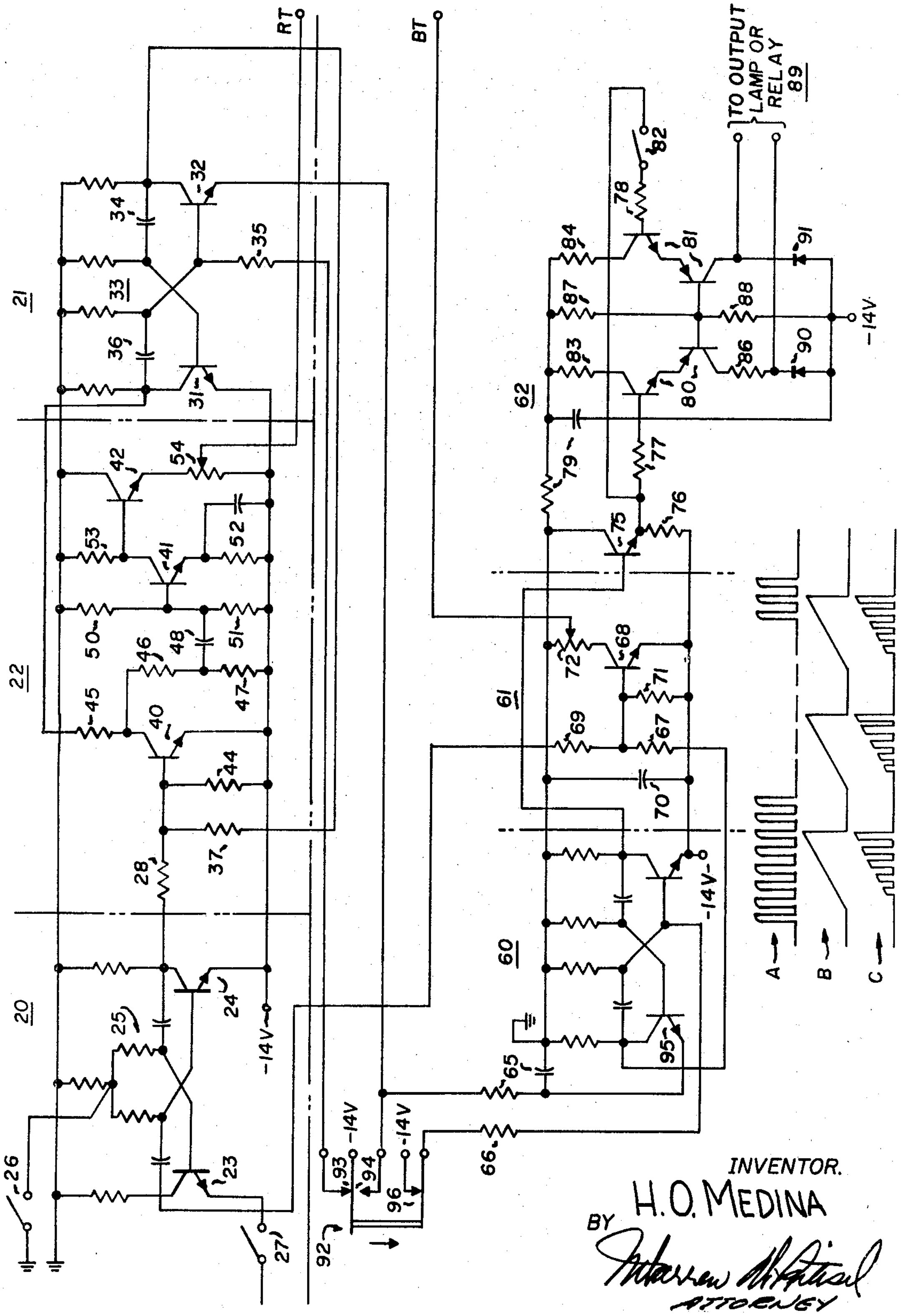
INVENTOR.
H. O. MEDINA
BY
ATTORNEY 3,343,100

TONE GENERATOR WITH INCREASING VOLUME AFTER EACH TONE INTERRUPTION

Hector O. Medina, Sagrado Corazon, Rio Piedras, Puerto Rico, assignor to International Telephone and Telegraph Corporation Filed Nov. 10, 1965, Ser. No. 507,127
5 Claims. (Cl. 331—37)

ABSTRACT OF THE DISCLOSURE

A combination generator for providing telephone ringing, supervisory, and busy signals, wherein a square wave generator is modulated by a sawtooth generator to provide bursts of ringing current which start at a low volume and increase in intensity to a high volume. The sawtooth generator is synchronized by telephone hookswitch contacts so that the tone always begins at the low volume level.

This invention relates to tone generators and more particularly to interrupted tone generators having an output with a volume which increases after each interruption.

Some of the newer signaling systems utilize electronic tone generators. Generally speaking, these generators are equipped to sound a given tone which may be interrupted to give an intermittent sound for telling a person that he has been called. If the sound is used in a conventional telephone system as a ringing signal, it may sometimes be heard in the receiver of the handset. If the handset is at a subscriber's ear when the tone first occurs, the ear may be damaged or pain might be experienced before the person hearing the tone can get the receiver away from his ear.

Ideally, the hookswitch of a telephone or similar instrument should be arranged so that it will cut off the receiver before it can be placed at the ear where the ringing tone may be heard at full volume. However, the timing may be such that this hookswitch control cannot occur. For example, the listener could put the receiver to his ear while holding the hookswitch down, during a silent period in the ringing cycle, so that he hears the ringing tone at full volume when it occurs. Since the ringing tone normally comes on abruptly, he would not have time to get the receiver away from his ear before he experienced pain.

On the other hand, if the ringing tone begins at a very low volume level and then raises in intensity to a full volume level, he would have time to move the receiver before he could experience this pain. In the past, devices have been produced which did cause an audible signal having an increasing volume. For example, one such device, often used in telephone offices, is called a "howler." However, a howler produces a steadily increasing tone which does not have to be synchronized with individual interruptions in the tone signal. Thus, if a howler type device were to be used with a ringing generator, the increasing volume of the ringing sound could occur at any time with respect to the start of each ringing sound. It could, therefore, be possible to make a connection to the ringing source at a time when the tone is at full volume.

Accordingly, an object of this invention is to provide new and improved tone generators with controlled volume after each tone interruption. In this connection, an object is to provide tone generators which produce all tones required by a telephone system, thereby reducing total costs by reusing various parts to produce different tones.

More specifically, an object is to produce intermittent ringing—or similar—signals which always begin at low volume and then increase in intensity to a loud volume.

In keeping with one aspect of the invention, two tone generators are used for producing ringing signals. One generator provides a generally square wave output signal which produces a single pitch tone of steady intensity. The other generator produces a wave form having a generally sawtooth shape. The sawtooth wave is then mixed with or used to modulate the single pitch tone. This produces an interrupted signal having the frequency of the single pitch tone with each tone burst having an increasing amplitude which follows a saw tooth pattern.

The above mentioned and other features of this invention and the manner of obtaining them will become more apparent, and the invention itself will be best understood by reference to the following description of an embodiment of the invention taken in conjunction with the accompanying drawings, in which:

The single sheet of drawing is a schematic circuit diagram which shows a tone generator constructed in accordance with the invention.

The examplary tone generator here shown and explained is used as a ringing generator in a small private telephone exchange having, perhaps, less than fifty lines. However, the election to relate the invention to this particular disclosure of a small telephone system should not be construed as limiting the scope of the invention. Quite the contrary, the invention could find utility in any signaling system where a signal having a variable intensity tone is desirable. In particular, the switch disclosed here could be any suitable start device.

For purposes of this description, the drawing may be divided into upper and lower halves. The circuits for producing dial, ringing, and supervisory tones are shown in the upper half. The circuit for producing busy tone is shown in the lower half.

The upper half of the drawing includes first and second generators 20, 21 feeding into a mixer and amplifying circuit 22. The first generator 20 produces a wave form A which causes a single pitch tone having a steady amplitude or intensity. The second generator 21 produces a wave form B having a generally sawtooth shape. When the single pitch, steady amplitude tone of wave form A is modulated by the sawtooth wave form B, the result is an interrupted tone which begins softly and then increases in intensity, as shown in wave form C.

The components of the single pitch tone generator 20 take the form of a well known free running, multivibrator circuit. The active multivibrator elements are comprised of two NPN transistors 23, 24. This multivibrator is free-running at a frequency or pulse repetition rate which is set by the R–C circuit 25.

If a switch 26 is closed, the multivibrator runs at a different speed. Thus, the multivibrator provides either of two single frequency tones. A tone of one frequency provides dial tone and the other frequency provides any other supervisory tone, such as an executive right of way tone. Preferably, the switch 26 open position will generate dial tone.

The switch 27 applies power to start the multivibrator and, therefore, the tone generator.

The output of the tone generator 20 is applied through an isolating resistor 28 to the mixer and amplifying circuit 22.

The second or sawtooth generator 21 also comprises a free-running multivibrator circuit having two NPN transistors 31, 32. Here, however, the timing circuit 33 provides an asymmetrical wave shape having a generally sawtooth pattern. The asymmetry results from a selection of the resistor and capacitor values which will prevent the capacitor 34 from fully charging.

The input or start circuit comprises a resistor 35 coupled to the base of transistor 32 and the capacitor 36. Thus, the potential applied over resistor 35 insures that capacitor 36 is charged. When this potential is removed and applied to the emitter of transistor 32, the fact that capacitor 36 is charged insures that the output at the collector of transistor 31 will always start at the beginning of a sawtooth pulse.

The output of the generator 21 is taken from the collector of transistor 31 and applied to the mixer and amplifying circuit 22 via a resistor 45.

The mixer and amplifier circuit 22 comprises three NPN transistors 40–42, the first two of which are used in common emitter configuration. The last, transistor 42, is used in an emitter follower configuration.

To provide an interrupted tone of variable intensity, the mixer stage inputs are applied to the base and collector of the transistor 40 via the resistors 28, 45. A base bias is applied to the transistor 40 via a resistor 44. Resistors 45, 46 and 47 provide impedance matching for multivibrator 21. The capacitor 48 provides an input coupling for the amplifier 41.

In operation, the mixer transistor 40 has an output which follows the wave form pattern of curve C. More particularly, the wave form of the output signal from the transistor 40 is fixed by the wave forms appearing at the collectors of transistors 31 and 24. The potential at the collector of transistor 24 varies in the wave form of a single frequency tone of steady intensity, as indicated by the curve A. The potential at the collector of transistor 31 varies in a sawtooth pattern as indicated by the curve B. The net result is, therefore, an output voltage at the collector of the transistor 40 having a variation as shown by the curve C, wherein the single frequency steady tone varies in a sawtooth pattern. The output of transistor 32 is fed to the base of transistor 40 to insure that no output is present at the collector of transistor 40 during the silent period (tone interrupted).

The transistor 41 is biased to function as a small signal A.C. amplifier. The bias for the base of this amplifier is taken from a voltage divider 50, 51. The emitter bias is taken from an RC network 52. Resistor 53 is a collector load.

The transistor 42 functions as an emitter follower to provide a high current gain. The amplitude of the output signal is determined by the setting of the potentiometer 54. The ringing signal output appears at terminal RT.

The circuit in the lower half of the drawing provides a busy tone generator. Its major circuit elements are a multivibrator 60, a mixer circuit 61, and a pair of electronic switches 62.

The input to the multi-vibrator 60 includes an RC filter 65 for eliminating voltage spikes caused by system noise. Resistor 66 provides means to control the start of the busy tone at the beginning of a busy tone pulse (function similar to resistor 35 for multivibrator 21).

The multivibrator 60 is a conventional free-running device operating at a frequency which is appropriate for use as a busy tone. The output of the multivibrator 60 is applied through a resistor 67 to the base of an NPN mixer transistor 68. The output of the dial tone multivibrator 20 is also applied to the base of the transistor 68 through a resistor 69. The output of the transistor 68 is, therefore, a mixture of these two tones. The output of the busy tone mixer 61 is a square wave since a sawtooth wave form is not required in operation.

The capacitor 70 filters out the voltage spikes (if any) appearing at the power supply. The resistor 71 provides a base bias for the mixer transistor 68 and the resistor 72 is a collector load which may be adjusted to select a desired amplitude for the output voltage. The output of the mixer stage 61 is taken from the potentiometer 72 to provide a busy tone.

The output of the multivibrator 60 is also applied to the base of an NPN transistor 75 connected in an emitter follower configuration to provide a high current gain. The load for the emitter is shown at 76. Two input base resistors are shown at 77, 78. A spike elimination filter is shown at 79.

Two electronic switches are shown at 80, 81 for driving either a relay or a lamp. Each of the switches 80, 81 comprises a series circuit including an NPN and a PNP transistor.

The input resistor 77 is connected from the emitter of the transistor 75 to the base of a first NPN transistor in switch 80. The emitter of the transistor 75 is also connected through a switch 82 and the other input resistor 78 to the base of the NPN transistor in the second switch 81. The collector loads for the NPN transistors 80, 81 are provided by the resistors 83, 84, respectively. The resistor 86 is a collector load for the PNP transistor of the switch 80. The resistors 87, 88 provide a voltage divider for supplying a reference potential to the PNP transistors of the switches 80, 81.

When either of the switches 80 or 81 close, a circuit is completed to either operate a relay or light a lamp at 89, as may be required for any supervisory or other purposes.

The diodes 90, 91 prevent transistor breakdown due to high voltage transients generated by inductive loads.

The circuit operates this way. Before a called subscriber lifts a handset, the switch contacts 93 are closed to charge a capacitor 36. When switch 92 is operated to provide ringing tone, a negative voltage is applied through the contacts 94 to the emitters of the transistors 32 and 95. This insures the start of the sawtooth generator 21 at the low volume start of its cycle and also starts the busy tone generator 60.

Thereafter, the output voltages of the three tone generators 20, 21, 60 mix to provide an output signal, as shown by wave form C, at ring tone terminal RT and to provide a square wave signal at busy tone terminal BT. Because the ringing cycle always begins at a low volume when the switch 92 operates, it is certain that the subscriber always first hears a low volume tone, thereby giving enough time to allow the subscriber to remove the receiver from his ear before he can hear a high volume tone.

If a supervisory tone is required, the operation is the same, but switch 26 is closed and the output tone represented by curve A has a different pitch.

The switch 96 provides a function similar to switch 93 for insuring the proper start of a busy tone cycle.

Thus, it is seen that a relatively few circuits are reused in various combinations to provide a plurality of tones.

While the principles of the invention have been described above in connection with specific apparatus and applications, it is to be understood that this description is made only by way of example and not as a limitation on the scope of the invention.

I claim:

1. An electronic tone generator for use in a telephone set comprising a plurality of tone sources, means in at least one of said sources for producing a single pitch tone of steady amplitude, means in at least another of said sources for producing a sawtooth wave form, means for mixing said single pitch tone with said sawtooth wave form to produce an interrupted signal having the frequency of the single pitch tone with each tone burst beginning at a low volume and increasing to a high volume, hookswitch means for initiating the start of each tone burst at said low volume, and means for synchronizing said increase of volume with a demand for tone indicated by operation of said hookswitch means.

2. A tone generator comprising first and second multivibrators, a first of said multivibrators being a free-running device having a symmetrical output signal of uniform frequency and amplitude, the second of said multivibrators having an asymmetrical output signal cyclically beginning at a low volume and increasing to a high volume, means for mixing said first and second signals to provide an output signal having said symmetrical tone in an envelope cyclically beginning at a low volume and increasing to a high volume.

3. The generator of claim 2 and means for varying the frequency of said first free-running device to produce a different freqency output signal.

4. The generator of claim 2 and a third free-running multivibrator operating at another frequency, and means for mixing said first and third frequencies to provide a different output signal.

5. The generator of claim 2 and means responsive to an operation of telephone bookswitch contacts for synchronizing said generators to provide an interrupted ringing tone beginning with a low volume and increasing to a high volume.

References Cited

UNITED STATES PATENTS 2,250,819 7/1941 Wolf ---------------- 331—46

ROY LAKE, *Primary Examiner.*

S. GRIMM, *Assistant Examiner.*